(12) United States Patent
Madineni et al.

(10) Patent No.: US 10,551,048 B2
(45) Date of Patent: Feb. 4, 2020

(54) AMPLIFICATION CIRCUIT AND HEAT SINK USED WITH A LIGHT EMITTING APPARATUS HAVING VARYING VOLTAGES

(71) Applicant: INGERSOLL-RAND COMPANY, Davidson, NC (US)

(72) Inventors: Vikram Madineni, Somerset, NJ (US); Jason Christopher Bartoszek, Bethlehem, PA (US)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 16/182,530

(22) Filed: Nov. 6, 2018

(65) Prior Publication Data

US 2019/0072265 A1 Mar. 7, 2019

Related U.S. Application Data

(60) Continuation of application No. 13/764,885, filed on Feb. 12, 2013, now Pat. No. 10,119,696, which is a division of application No. 12/145,824, filed on Jun. 25, 2008, now Pat. No. 8,421,375.

(60) Provisional application No. 60/946,004, filed on Jun. 25, 2007.

(51) Int. Cl.
*H05B 33/08* (2006.01)
*F21V 29/70* (2015.01)

(52) U.S. Cl.
CPC .......... *F21V 29/70* (2015.01); *H05B 33/0803* (2013.01); *H05B 33/0818* (2013.01)

(58) Field of Classification Search
CPC .......... F21K 9/00; F21V 29/70; H05B 33/08; H05B 33/0803; H05B 33/0815; H05B 33/0818; H05B 37/02
See application file for complete search history.

(56) References Cited

U.S. PATENT DOCUMENTS

2006/0043911 A1* 3/2006 Shao .................. H05B 33/0815
315/291
2007/0086196 A1* 4/2007 Wong ....................... F21K 9/00
362/294

* cited by examiner

*Primary Examiner* — Jimmy T Vu
(74) *Attorney, Agent, or Firm* — Jones IP Group; Wayne A. Jones

(57) ABSTRACT

A light emitting apparatus having a housing including a portion defining a thermally conductive outer surface, a light source positioned within the housing, and an internal heat sink thermally coupling the light source and the thermally conductive outer surface portion of the housing. The light source may be a solid state device, such as a light emitting diode.

7 Claims, 2 Drawing Sheets

AMPLIFICATION CIRCUIT AND HEAT SINK USED WITH A LIGHT EMITTING APPARATUS HAVING VARYING VOLTAGES

CROSS REFERENCE TO RELATED APPLICATIONS

This application is a continuation of application No. U.S. Ser. No. 13/764,885 filed Feb. 12, 2013, which claims priority from U.S. patent application Ser. No. 12/145,824, filed Jun. 25, 2008, (issued as U.S. Pat. No. 8,421,375), which claims benefit of priority from U.S. Provisional Application No. 60/946,004, filed Jun. 25, 2007, the contents of which earlier applications are incorporated herein by reference.

BACKGROUND OF THE INVENTION

The advent of Light Emitting Diode (LED) technology and it's progressive development has exposed the shortcomings of Xenon Bulbs in areas of short battery life. The increasing use of battery operated tools in workplaces and the need for energy efficient bright light and increased durability led to the design of LEDs in flashlights powered from batteries.

Currently, tools and flashlights are designed to use just one battery voltage. Although two close voltages have been used (9.6 and 12.0), performance (brightness or speed) are still proportional to input voltage. Thus, it may be advantageous to have a flashlight that worked with any battery input voltage, while maintaining even brightness throughout its use. This capability offers the user great flexibility in leveraging any of his existing batteries. LED technology also demands that the LED be driven at regulated junction temperature conditions giving a user years of lifetime and eliminating the need for replacement of Xenon bulbs.

Targeted application scenarios in automotive repair or MRO (Maintenance and Repair Organizations) require bright light in the range of 120-170 lumens. This may be achieved with a series of LEDs driven at 0.35 A by a power source. LED's with forward voltage in range of 3.2-3.8V when connected in series represent a total voltage drop of 9V and greater. (i.e. 3 or more LEDs in series, each producing ≈60 lumens). Highly cost effective and efficient Buck operation cannot be incorporated as the output voltage will be more than certain battery voltage ranges. Also, optically converging the beams from three different LED's towards a single beam output may be a challenge.

SUMMARY OF THE INVENTION

The present invention provides in one aspect a light emitting apparatus comprising a voltage source for supplying an input voltage, a light emitting diode electrically coupled to the voltage source, and a pulse width modulation controller for controlling a duty cycle of the input voltage supplied. A resistor is electrically coupled between the voltage source and the light emitting diode. An amplification circuit is electrically coupled to the resistor and the pulse width modulation controller for supplying a feedback voltage to the pulse width modulation controller, the feedback voltage being proportionally changed relative to a resistor voltage measured across the resistor, a current through the first resistor or a resistance of the first resistor.

The present invention provides in another aspect a light emitting apparatus comprising a housing including a portion defining a thermally conductive outer surface. A light emitting diode is positioned within the housing. An internal heat sink thermally couples the light emitting diode and the thermally conductive outer surface portion of the housing.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Current sensing in an LED driver may be based on low side sensing in a resistor connected to cathode of the LED and other end being referenced to ground. The voltage developed (Iload*Rsense) is usually fed back to PWM controller to regulate the duty cycle and control the output current. Low side sensing, however, is effective only for load current in the range of 0.2-0.3 A and leads to increasing losses as the load current increases. At 1 A, power loss can be as high as 20% based on feedback voltage required by PWM controller. It may, however, be desirable to have an output current of 1 A because high luminous output may be achieved by driving the LED 104 at a current of 1 A having a forward voltage of the LED in the range of 3.2-3.6V, where the forward voltage is less than the input voltage condition.

Figure 1:
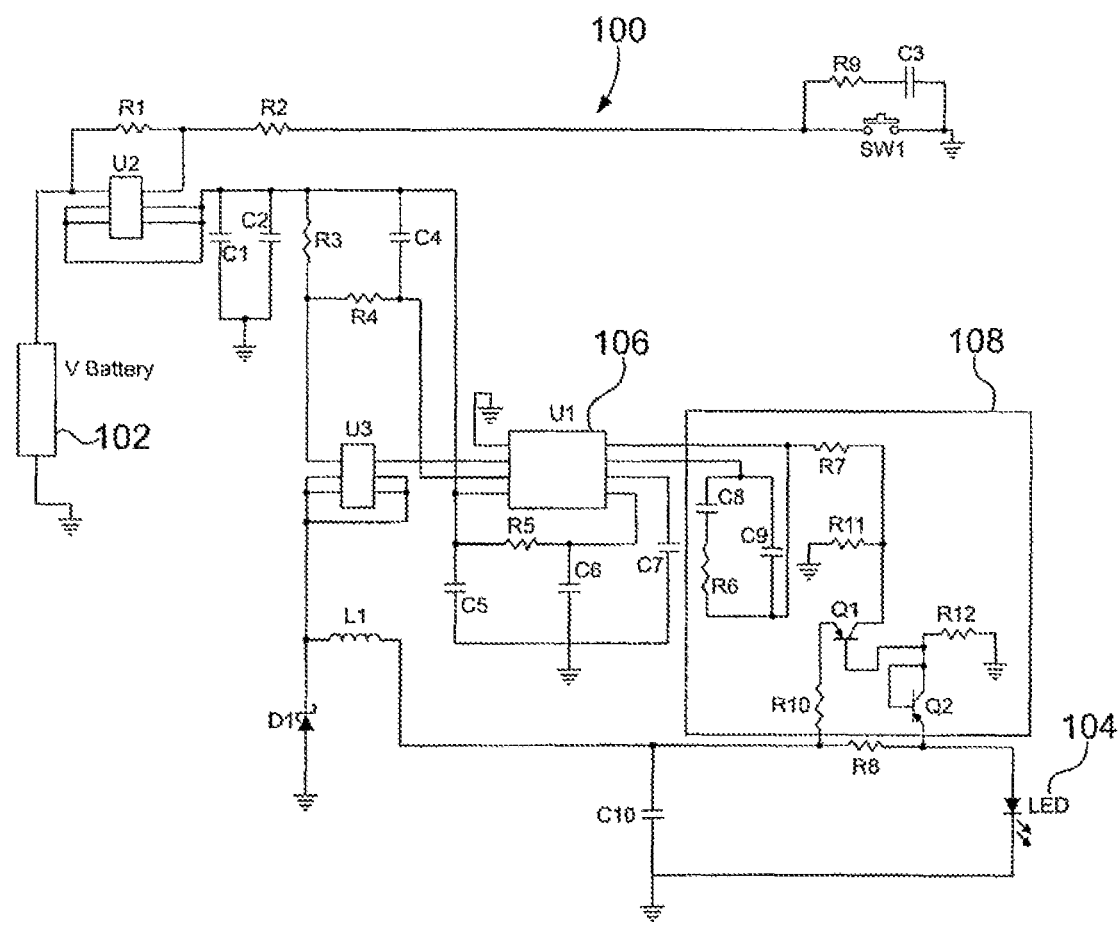
FIG. 1 is a diagram of a light emitting apparatus according to an exemplary embodiment of the present invention.

Referring to FIG. 1, a circuit 100 of a light emitting apparatus according to an exemplary embodiment of the present invention is illustrated. The circuit 100 includes a voltage source 102 for supplying a voltage and a light emitting diode 104 electrically coupled to the voltage source 102. The light emitting apparatus also includes a PWM controller 106 for controlling a duty cycle and a resistor RS electrically coupled between the voltage source 102 and the light emitting diode 104. The light emitting apparatus of the present embodiment further includes an amplification circuit 108 electrically coupled to the resistor RS and the PWM controller 106. The amplification circuit 108 supplies an output voltage to the PWM controller 106 that is a given ratio higher than the voltage measured across the resistor RS.

A step-down circuit may be used to regulate the current into the LED 104, based on current sense feedback control. The exemplary light emitting apparatus is desirably configured to use a wide range of voltage sources 102 of different chemistries and voltages. A given range of voltages may be 5-21V, however, the invention is not limited to such a range and may be higher or lower. As described above, it is desirable to regulate the output current of the LED 104 to a desired current for a variety of operating conditions, including various voltages. In the present embodiment, the desired current is 1 A, but other current values may be utilized. Thus, the light emitting apparatus of the present embodiment uses the PWM controller 106 to control the duty cycle of the circuit proportional to the desired current by sensing any increase or decrease of current as the input voltage value changes over the discharge cycle of the voltage source 102 or as different voltage sources 102 are used.

The circuit 100, incorporating the current sense feedback control, feeds back to the PWM controller 106 a voltage proportional to the desired current for the LED 104. The PWM controller 106 is configured to regulate the desired current based on a target feedback voltage, for example, a feedback voltage of 0.7V at FB pin 4, received from resistor RS. In the present embodiment, the amplification circuit 108 is electrically coupled to the resistor RS and the PWM controller 106 and is configured to supply the target feedback voltage to the PWM controller 106 (e.g. a 0.7V feedback voltage). In the light emitting apparatus of the present exemplary embodiment, the amplification circuit 108 is supplying a feedback voltage that is proportionally higher than a voltage measured across the resistor RS. The proportional increase in the voltage is dependent upon the desired current, the resistance of resistor RS and the target feedback voltage.

In the exemplary embodiment discussed herein, the desired current is 1 A and the illustrated resistor RS has a resistance of 0.1.OMEGA. As such, the voltage measured across the resistor RS will be 0.1V. If the target feedback voltage is 0.7V, the amplification circuit is configured to increase the measured voltage 7 fold. If the desired current or target feedback voltage is changed, or if a different resistor RS is used, the amplification circuit 108 is modified to provide an appropriate proportional increase.

Figure 2:
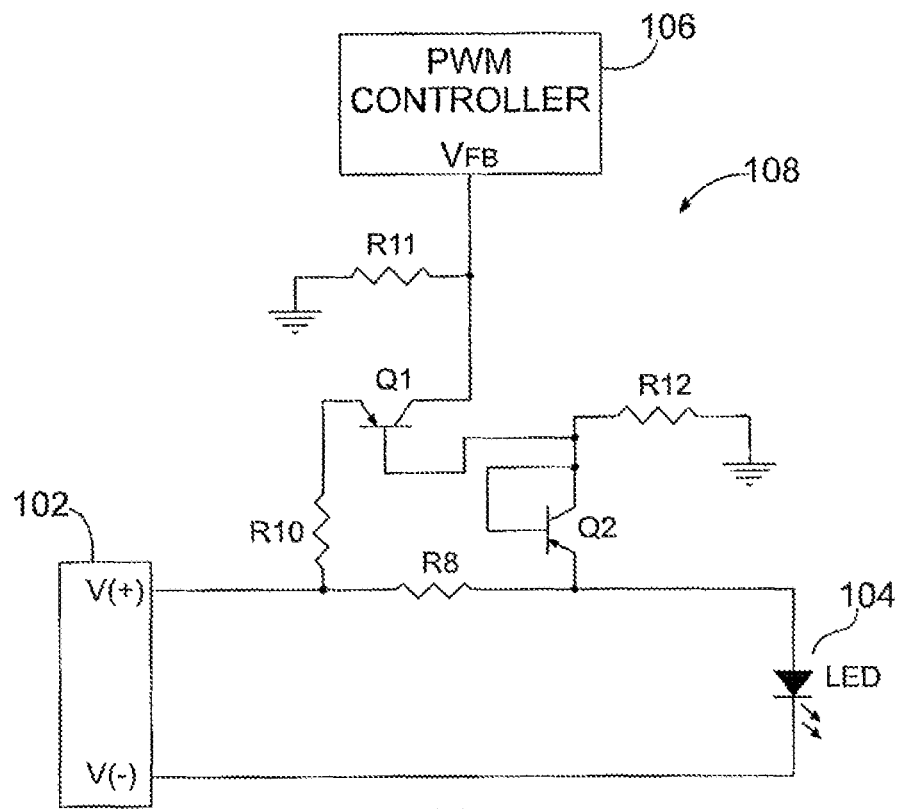
FIG. 2 is a diagram showing a portion of the diagram in FIG. 1.

An exemplary amplifying circuit 108 is illustrated in FIG. 2 and includes a transistor pair Q1, Q2 arranged as a current mirror, resistors RS, R10 arranged as current divider, and equivalent collector load resistors R11 & R12, to provide the target feedback voltage to the PWM controller 106 for regulation of the desired current. The current mirror arrangement holds both transistor Q1, Q2 currents the same and thus both emitters at the same voltage. Starting at common node RS/R10, the voltage dropped across RS has to be the same as across R10. If 1 A is desired through RS, a ratio of 1000:1 will allow just 1 mA to be conducted through Q1. This allows for a very small value to be chosen for RS (0.1.OMEGA.). In operation, a higher ratio, e.g. 1300:1, may be used to compensate for PWM controller impedance. R11 and R12 are desirably equivalent and have a value chosen to offer the correct feedback voltage to the PWM controller 106 at the Q1 current level chosen.

The values for the electrical components shown in FIG. 2 are for supplying a feedback voltage of 0.7V to the PWM controller 106 for a voltage of 0.1V measured across the resistor RS having a resistance of 0.1.OMEGA. As will be recognized by one skilled in the art, the amplification circuit 108 allows for the use of a resistor RS having a lower resistance and thereby a lower loss. In the illustrated embodiment, a resistance of 0.1.OMEGA. leads to a loss of only 0.1 W for the total output power of 3.6 W. Thus, a higher energy transfer ratio is achieved, such as, for example, in the power range of a 4 W LED at wide variable input voltage range. The lower heat dissipation lost for current measurement may allow a longer run time for the light emitting apparatus.

The values for the electrical components shown in FIGS. 1 and 2 are, however, only exemplary. It is contemplated that other values may be used. It is also contemplated that different configurations of electrical components may be used for supplying a target feedback voltage to the PWM controller that is higher than a voltage measured across the resistor RS. It is also contemplated that other amplifying devices (e.g., an operational amplifier) may be used for supplying a target feedback voltage to the PWM controller 106 that is higher than a voltage measured across the resistor RS.

The exemplary embodiment of the present invention drives an LED at a load current of 1 A to achieve the same lumen output as three or more lower current driven LEDs. The forward voltage of LED may operate at 3.7V and 1 A of current. Thus, a highly efficient Buck operation can be incorporated as the output voltage is always less than the range of voltages supplied by the voltage source 102. The PWM controller 106 controls the duty cycle to regulate the current to 1 A based on input voltage and power available. The PWM controller 106 may be configured to shut down as the input voltage goes under a threshold value (e.g. 4.2V), thereby providing an under voltage cut off feature. Thus, the battery source will be protected from over discharge failure or damage.

The LED's photometric output increases proportionally with the current, as long as junction temperature is maintained at permissible levels. An LED may characteristically show variable photometric output with a change in junction temperature. Elevated temperatures may also lead to accelerated LED degradation. Thus, it may be desirable to maintain and control the junction temperature.

Figure 3:
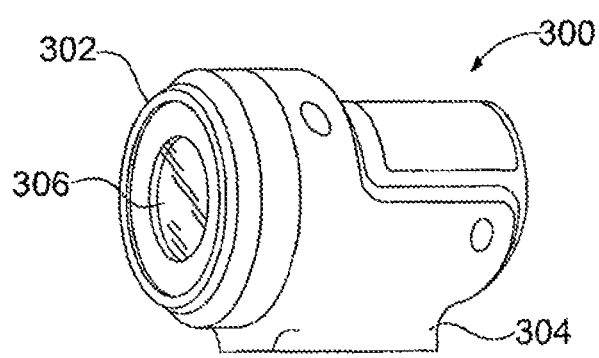
FIG. 3 is a perspective view of a light emitting apparatus according to an exemplary embodiment of the present invention.

Referring to FIG. 3, a light emitting apparatus according to another exemplary embodiment of the present invention is shown. The exemplary light emitting apparatus includes a housing 300 which houses the LED in alignment with a lens 306. The illustrated housing includes first and second housing components 302 and 304. While two housing components are illustrated, more or fewer may be utilized.

In the present embodiment, the LED is mounted inside of the housing 300 on an internal heat sink (not shown) that is thermally connected to a portion of the outer housing 300. The internal heat sink may be, for example, a metal core board, but other structures configured to transfer heat from the LED to the portion of the outer housing 300 may be utilized. The portion of the outer housing 300 to which the internal heat sink is thermally connected is desirably made of a material which also transfers heat, such that the portion of the outer housing 300 provides a large heat dissipating outer surface exposed to atmosphere.

The portion of the outer housing 300 to which the internal heat sink is thermally connected may, for example, be a finished Aluminum surface as a part of housing 300. Aluminum includes properties (i.e. strong and light) that provide for an elegant, sleek design that dissipates heat for controlling the temperatures of the LED. It is contemplated, however, that other materials may be used for the thermal dissipating surface area. Additionally, it is contemplated that one or both housings 302, 304 may include the portion of the heat sink.

This exemplary light emitting apparatus helps in improved thermal performance by "conductively" transferring heat from the LED junction to an internal heat sink and from an inner portion of the heat sink to an outer heat dissipating surface area. The exposed surface to atmosphere may also result in increased heat dissipation through radiation. Thus, this design innovatively maintains temperature of a high power LED at safe permissible levels even when operated at high currents.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A light emitting apparatus comprising:
a housing including a portion defining a thermally conductive outer surface;
a voltage source for supplying an input voltage;
a high power LED light source positioned within the housing, wherein the high power LED is electrically coupled to the voltage source;
a pulse width modulation controller for controlling a duty cycle of supplied input voltage;
a first resistor electrically coupled between the voltage source and the light emitting diode;
an amplification circuit electrically coupled to the first resistor and the pulse width modulation controller for supplying a feedback voltage to the pulse width modulation controller, the feedback voltage being proportionally changed relative to a resistor voltage measured across the first resistor, a current through the first resistor or a resistance of the first resistor;
a lens housed by the housing and aligned with the light source; and
an internal heat sink located to thermally couple with the high power LED light source and conduct heat away from the light source, independent of another conducting medium, and transfer the conducted heat to the thermally conductive outer surface portion of the housing, upon being connected to the thermally conductive outer surface; and
wherein a junction temperature of the high power LED is maintained and controlled through the thermal coupling of the high power LED light source, the internal heat sink and a conductive outer surface portion of the housing.

2. The light emitting apparatus of claim 1 wherein:
the apparatus is configured to control an output current through the high power LED to be about 1 A and a forward voltage across the high power LED to be in a range of about 3.2V to about 3.7 V.

3. The light emitting apparatus of claim 1 wherein:
the pulse width modulation controller is configured to control the duty cycle proportional to an output current of the high power LED as the input voltage changes.

4. The light emitting apparatus of claim 1, wherein:
the input voltage is in a range of about 5V to about 21 V.

5. The light emitting apparatus of claim 1, wherein:
the amplification circuit is an operational amplifier.

6. The light emitting apparatus of claim 1, wherein:
the pulse width modulation controller is configured to shut down if the input voltage is less than the predetermined threshold voltage, the predetermined threshold voltage being greater than zero.

7. The light emitting apparatus of claim 1, wherein:
a photometric output of the high power LED is proportionate with the current supplied to the high power LED.

* * * * *